Aug. 20, 1968  K. D. RICHMOND  3,398,218
METHOD AND APPARATUS FOR MANUFACTURING TRANSMISSION BELTS
Filed April 22, 1965
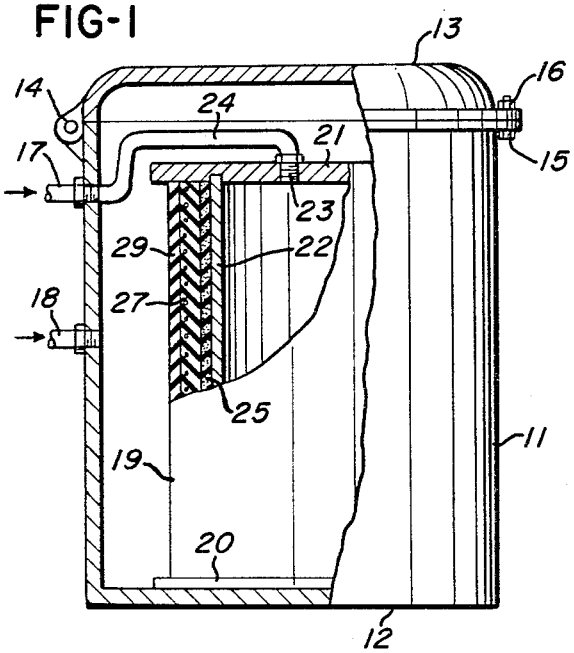
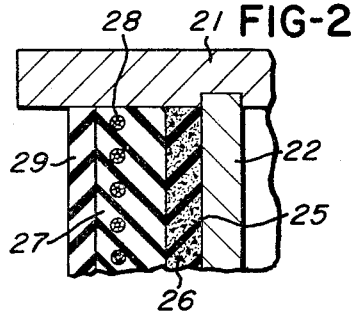
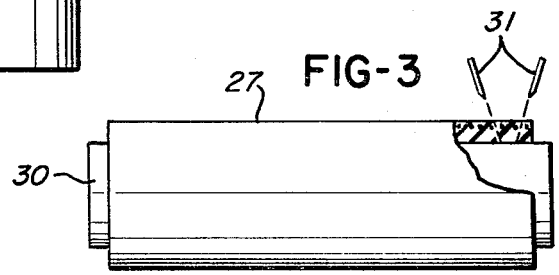
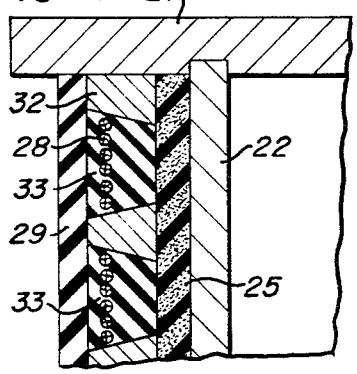
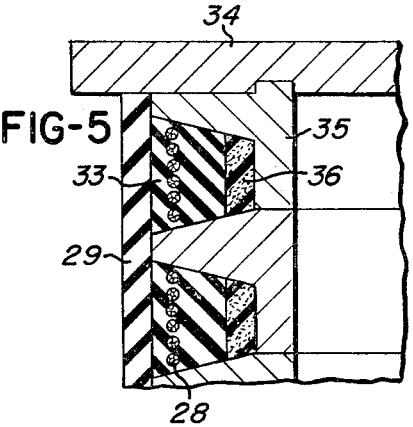
INVENTOR.
KENNETH D. RICHMOND
BY
Reuben Wolk
ATTORNEY United States Patent Office 3,398,218
Patented Aug. 20, 1968

3,398,218
METHOD AND APPARATUS FOR MANUFACTURING TRANSMISSION BELTS
Kenneth D. Richmond, Nixa, Mo., assignor to Dayco Corporation, Dayton, Ohio, a corporation of Ohio
Filed Apr. 22, 1965, Ser. No. 450,142
14 Claims. (Cl. 264—45)

ABSTRACT OF THE DISCLOSURE

A method of making transmission belts by assembling a belt sleeve or individual belt bodies in the conventional manner and placing them within a vulcanizing chamber. The sleeve or body is placed around an uncured annular rubber member or series of strips which have blowing agents incorporated therein and wrapped around a steel inner mold member. Inward pressure is applied to the body or sleeve while at the same time the application of heat causes the blowing agent to expand and also apply outward pressure to the sleeve or body.

---

This invention relates to a method and apparatus for manufacturing transmission belts, and particularly to such a method and apparatus pertaining to the vulcanizing or curing of such belts.

In the manufacture of power transmission belts, which are usually in the form of V-belts, it is normal practice to build up a sleeve consisting of superimposed layers of various types of material and cure this sleeve in this shape, subsequently cutting the cured sleeve into individual belts. It is also possible to cut the sleeve into individual belt bodies prior to curing. Following this standard practice, the belt sleeve will be made from a layer of rubber, and a continuous strength cord which is spirally wrapped around this rubber, and a superimposed additional layer of rubber. This cylindrical sleeve will then be placed on a mold and vulcanized by inserting the mold and sleeve within a vulcanizing chamber. After the vulcanization process is completed the sleeve is removed and cut into individual belts which may be used in this form or, alternatively, may be wrapped with fabric before use. Alternatively, the sleeve may be cut into individual belt bodies prior to curing.

It has been found that belts manufactured by this method have been generally satisfactory, but in recent years the automotive industry has created a demand for belts having a very close dimensional tolerance. It is highly important in such automotive uses for the manufacturer of the belts to provide the industry with belts which can be depended upon to maintain their original dimensions, particularly their length. The problem has become acute in many cases where it has been found that such belts have a tendency to shrink after use; this is primarily caused by the shrinkage of the longitudinally extending strength cords due to the compacting tendencies of the rubber compound located inwardly of this cord during the curing process. While some progress has been made in the use of prestretching the entire belt in order to establish a predetermined dimensional tolerance, such a process has not been entirely satisfactory because it is expensive and may reduce the life of the belt. The industry has long been desirous of finding a method of maintaining the dimensional stability of the belt cord so that shrinkage will not take place either during the vulcanizing process or subsequent use. The conventional or standard vulcanizing process described above will cause a shrinkage of the cord due to subsequent compacting of the compression section which is located inwardly of the cords.

In accordance with the present invention, it has been found that this tendency to shrink may be inhibited by the use of an additional member in the mold assembly which will exert an outward pressure against the belt sleeve during curing, this outward pressure being sufficient to overcome the inward pressure and the inherent tension of the cords. More specifically, this is accomplished by the use of a rubber cylinder between the inner mold and the belt sleeve in which the cylinder is composed of a stock containing blowing agents (known as "blow stock"), such that exposure to heat will cause the stock to expand, and thus create the necessary outward pressure. A specific method of accomplishing this novel concept will be described below. It is also feasible to accomplish this with individual belt bodies, either by utilizing a cylinder or individual strips of the blow stock.

It is therefore a principal object of the invention to provide a method of manufacturing belts which will overcome belt shrinkage during the manufacturing process.

It is a further object of the invention to prestretch belts during curing in order to maintain dimensional stability of the cord during belt use in field applications.

It is a further object of the invention to provide an apparatus to accomplish the above by a simple adaptation of standard apparatus.

It is a further object of the invention to provide a means for applying uniform outward pressure against the belt sleeve during curing.

These and other objects of the invention will be readily apparent from the following specification, claims, and drawings, in which:

FIGURE 1 is an elevational view in partial section illustrating the novel apparatus.

FIGURE 2 is an enlarged sectional view illustrating the relationship of the belt sleeve and the novel apparatus.

FIGURE 3 is an elevational view in partial section illustrating the final step in preparing the belts after vulcanizing.

FIGURES 4 and 5 are views similar to FIGURE 2, illustrating variations of the invention.

Referring now to the drawings, reference numeral 11 designates a substantially cylindrical heating chamber, similar to an autoclave which is conventional in the vulcanization of belts, and in which the mold and sleeve assembly is to be placed. The chamber has a bottom 12, and a cover 13 which closes off the chamber. The cover is pivoted at a hinge 14 for opening and closing and may be locked to the flange 15 of the chamber by means of a bolt 16. Steam may be brought into the chamber by two separate inlets designated as 17 and 18 in order that this steam may be applied at different pressures to the interior and the exterior of the building drum or mold 19 which is shown in position within the chamber. The mold 19 is essentially cylindrical and has a bottom 20 and top 21 and an outer wall 22. In the center of the top 21 is an aperture 23 through which steam may be conducted from the inlet 17 via hose 24. This steam which is thus conducted to the interior of the mold is preferably at a pressure of about 65 pounds p.s.i., whereas the steam conducted to the exterior of the mold by means of inlet 18 will be at a pressure of approximately 95 pounds p.s.i., thus creating a differential pressure against the outside of the mold assembly amounting to 30 pounds p.s.i. As shown in FIGURES 1 and 2, the wall 22 of the mold is the structure upon which the remaining portion of the mold is assembled. According to standard practice the belt sleeve would be placed directly over the wall 22 and wrapped with a flexible cylindrical member prior to placing the bottom and top 20 and 21 on this assembly to form a completed mold assembly. As stated above, it has been found that the use of this procedure causes the cord to shrink inwardly under the externally applied curing pressure and the inherent tension of the belt cords which are a part of the belt sleeve.

In accordance with the present invention the mold assembly is modified by first applying a hollow cylindrical member 25 about the inner mold wall 22. This member consists of conventional rubber material into which has been compounded a suitable blowing agent (designated by reference numeral 26) in approximately the ratio 5 to 15 parts of the blowing agent per 100 parts of rubber, and preferably about 10 parts per 100. The blowing agent used can be a material such as ammonium bicarbonate, ammonium carbonate, sodium bicarbonate, sodium carbonate, or diazo amino benzene. However, the present invention does not depend upon any specific blowing agent and others are equally suitable. This blowing agent will be compounded with conventional natural or synthetic rubber material by means of a mill such as used in conventional rubber processing, thus forming "blow stock" which is formed into a cylinder 25. The cylinder should be anywhere from .030 inch to .090 inch in thickness, with the optimum thickness preferably about .060 inch. The exact thickness may be utilized to control the subsequent processing. After the cylinder 25 is placed over the mold, the belt sleeve 27 is then placed over the cylinder; this belt sleeve is a conventional sleeve consisting of various types of rubber or fabric material which are well known in the prior art, and including a continuous cord 28 which is spirally wrapped around the sleeve as shown. Surmounting the belt sleeve is an outer cylindrical member 29 which is used to maintain even pressure on the belt sleeve during the curing operation. This is formed of a cured rubber material which is sufficiently flexible to be placed over the sleeve. This entire assembly is placed within the mold top and bottom to form a completed mold assembly, which is then placed within the chamber 11. The steam hose 24 is connected to the top of the mold at its aperture 23.

In the above process the belt sleeve is now ready for curing and the sleeve 27, as well as the blow stock member 25, is in an uncured condition. The assembly is placed in the chamber 11 and the cover locked in place to form a pressure tight vessel. Steam is applied through inlets 17 and 18, and as stated above, this applies an external pressure of approximately 95 pounds p.s.i. and an internal pressure of approximately 65 pounds p.s.i., and creates a temperature ranging from 290° F. to 300° F. The differential pressure created will force the sleeve 27 inward against the blow stock member 25 so that the dimensional stability will be maintained during the curing process. At the same time the blowing agent within the cylinder 25 will expand and increase the thickness of the cylinder anywhere from 1½ to 2½ times, with an optimum figure being two times. For example, if the blow stock cylinder was originally formed in a thickness of .060 inch, it will expand to have a thickness of about .120 inch. The external pressure thus created will overcome the tendency of the cord to shrink under the curing pressure created by the 30 pound differential. The expansion of the blow stock cylinder will thus maintain the neutral axis portion of the belt sleeve (including the cord) under tension. This desirable condition is achieved because the outward pressure created by the expansion of the blow stock is transmitted through the inner portion of the belt sleeve to the cord to hold it in place.

After the curing cycle has been completed, which will occur in approximately 40 minutes, the steam lines are shut off, the pressure chamber opened, and the mold assembly removed. The cured sleeve is then removed from the mold while the member 25, which is now of no further value, is discarded. The outer cylindrical member 29 may be reused. The sleeve 27 is placed on a cutting mandrel 30 as shown in FIGURE 3 and is subjected to conventional cutting processes as, for example, by the use of cutters 31 which are set at an angle to cut the belt into the required trapezoidal cross section.

The improved properties of the belts made by the novel method using blow stock have been found to be quite appreciable. In an effort to compare the results of belts made by this novel method with those made by a standard method, a single belt sleeve was cured using blow stock to cure half the sleeve, and a standard arrangement for the other half. The final belts were cut as described above and tested by a conventional testing machine which is used to check the amount of stretch for each belt under standard test conditions. A comparison between the original length of the belt and its length after testing indicated that the average belt manufactured by the standard method has a stretch of $19/32$ seconds, while the belt made by the novel method has a stretch of $10/32$ seconds, or $9/16$ inch. This is a considerable improvement and clearly illustrates that the novel method successfully reduces the amount of stretch in a completed belt. Table I reflects a series of such comparisons with their averages:

TABLE I.—BELT STRETCH IN INCHES
[250 pounds tension, 7200 r.p.m., 10 minutes]

|  | Belt Molded by Standard Method | Belt Molded with .060 Blow Stock |
| --- | --- | --- |
| Belt A | 20/32 |  |
| Belt B | 17/3 |  |
| Belt C | 19/32 |  |
| Average | 19/3 |  |
| Belt D |  | 9/3 |
| Belt E |  | 11/32 |
| Belt F |  | 11/32 |
| Average |  | 10/32 |

Another test which may be used to compare the belts involves the measurement of that pull on the belt (in terms of pounds) which is required to elongate the belts to a given percentage of elongation. This was again tested by forming half a cylinder by one method and half by the other. Table II, which is reproduced below, clearly illustrates that a greater pull was necessary to achieve a given elongation of the belt made by the novel method, which is another way of expressing the fact that there is less elongation within the belt. As the table illustrates, there is an improvement of roughly 12% in the belt made by the present invention compared to the one made by the standard method.

TABLE II.—PULL (IN POUNDS) REQUIRED TO ACHIEVE VARIOUS PERCENTAGES OF ELONGATION STANDARD METHOD vs. BLOW STOCK METHOD

|  | 1% | 2% | 3% | 4% | 5% | 6% |
| --- | --- | --- | --- | --- | --- | --- |
| Belt Molded by Standard Method | 330 | 660 | 890 | 1,080 | 1,315 | 1,525 |
| Belt Molder by Blow Stock | 370 | 720 | 1,000 | 1,275 | 1,500 | 1,700 |

The exact amount of tension or prestretching in the belt can be controlled by changing the percentage of the blowing agent in the blow stock, or by changing the thickness of the blow stock. An example of the latter method of control is illustrated in Table III in which belts molded by the use of .030 inch blow stock are compared with .060 inch blow stock. Again the amount of pull required to achieve given elongations were compared; as illustrated in Table III, an increase in the width of the stock from .030 inch to .060 inch improved the stretch factor by approximately 3% to 6%.

TABLE III.—COMPARISON OF PULL (IN POUNDS) REQUIRED TO ACHIEVE VARIOUS PERCENTAGES OF ELONGATION USING .030 INCH vs. .060 INCH BLOW STOCK

|  | 1% | 2% | 3% | 4% | 5% | 6% |
|---|---|---|---|---|---|---|
| Belt Molded with .030 inch stock | 343 | 597 | 820 | 1,040 | 1,260 | 1,467 |
| Belt Molded with .060 inch stock | 363 | 633 | 867 | 1,103 | 1,317 | 1,507 |

It is also possible, in accordance with the present invention, to cure individual uncured belt bodies which have been previously cut in trapezoidal form. One such variation is illustrated in FIGURE 4 in which a portion of the mold assembly is illustrated in cross section, it being understood that this is a part of a mold which may be assembled in the curing chamber 11 as shown in FIGURE 1. In this case the outer wall 22 and the top 21 of the mold are the same as previously described, and the cylindrical member 25 is also the same. Instead of assembling a sleeve such as sleeve 27, however, a plurality of individual uncured trapezoidal belt bodies 33 are assembled alternately in stacked relationship with a number of rings 32 to form a complete stack of alternating belt bodies and rings assembled outwardly of the cylindical member 25. The outer cylindrical member 29 is then assembled as before. The process is identical to that previously described, and the member 25 applies outward pressure against the inner surface of each of the belt bodies to create the same restraining effect aganist shrinkage of the cords 28 as described above.

A further modification is illustrated in FIGURE 5 in which uncured belt bodies 33 are again assembled in a mold as above. In this case, however, the inner cylindrical wall of the mold and the cylindrical blow stock member are not used; instead a series of rings 35 are stacked to form a substantially cylindrical mold forming inner and side walls of annular cavities between the rings, these cavities receiving the belt bodies 33. Mounted on the inner walls of these cavities are a number of uncured cylindrical rubber strips 36 which are formed of the same blow stock as the member 25. The above assembly is then surmounted by the outer cylindrical member 29, and the entire assembly placed within the mold which includes a top 34. The same process described above is used to provide curing, but in this case the outward pressure is provided against the inner surface of each of the belt bodies 33 by its corresponding strip 36 to provide the same result.

Any of the above methods may be used to create belts in accordance with the invention, the exact method and apparatus depending upon the type of belt being manufactured. It should be understood, for example, that the endless cord 28 need not be the only cord used in building the belt sleeve, but that there may be two or more layers of such cord in the belt.

While the invention has been described with respect to specific embodiments, it is understood that the process involved may be equally applicable to other types of belts as well.

What is claimed is:

1. A method of making a transmission belt from an uncured belt body having at least one endless strength cord embedded therein, comprising the steps of concentrically assembling said body and an uncured rubber member having a blowing agent incorporated therein, subjecting said body to heat and simultaneous pressure in a direction toward said member, subjecting said member to heat, and causing said member to expand and apply pressure against said body while curing said body.

2. The method of claim 1 in which said belt body is a hollow cylindrical sleeve and said member is a hollow cylinder having one surface coextensive with one surface of said sleeve.

3. The method of claim 2 including the further step of cutting a plurality of belts from said sleeve.

4. The method of claim 1 in which said belt body is in the form of an individual belt.

5. The method of claim 4 in which said member is a hollow cylindrical strip coextensive with one surface of said belt and parallel to the plane of said cords.

6. A method of making a transmission belt from a heat curable belt body having at least one endless tension cord embedded therein, comprising the steps of placing an uncured rubber cylinder on a mold, said cylinder having a blowing agent dispersed therein, placing said body around said cylinder, heating said cylinder and said body to cause said agent to blow and expand said cylinder to apply pressure against said body, and simultaneously curing said body.

7. A method of making a transmission belt from an uncured belt body having at least one endless strength cord embedded therein, comprising the steps of placing an uncured rubber cylinder on a mold, said cylinder having a blowing agent dispersed therein, placing said belt body over said cylinder, applying radially inward pressure to said body, and heating said cylinder to blow and expand said cylinder outwardly to apply pressure against said body.

8. A method of making transmission belts from individual uncured belt bodies having endless strength cords embedded therein, comprising the steps of placing an uncured rubber cylinder on a mold, said cylinder having a blowing agent dispersed therein, placing said bodies around said cylinder, heating said cylinder and said bodies to cause said cylinder to expand and apply pressure against said bodies, and simultaneously curing said bodies.

9. A method of making transmission belts from individual uncured belt bodies having endless strength cords embedded therein, comprising the steps of placing a plurality of separate cylindrical rubber strips on a mold, said strips having a blowing agent dispersed therein, placing said bodies around said strips and said mold, heating said strips and bodies to cause said strips to expand and apply pressure against said bodies, and simultaneously curing said bodies.

10. An apparatus for making a transmission belt from an uncured belt body having at least one endless strength cord embedded therein, comprising a first means upon which said body is mounted, a second means upon which said first means is mounted, said first means being heat-reactive to apply outward pressure against said body, and pressure means for applying inward pressure against said body.

11. The apparatus of claim 10 in which said first means is a cylindrical rubber sleeve having a blowing agent incorporated therein and coextensive with said first means.

12. The apparatus of claim 10 in which said first means comprises a plurality of separate cylindrical rubber strips having a blowing agent incorporated within.

13. An apparatus for making a transmission belt from an uncured belt body having at least one endless tension cord embedded therein, comprising a cylindrical mold member, an uncured cylindrical rubber member having a blowing agent incorporated therein and surrounding said mold member, said rubber member adapted to retain said belt body outwardly thereof, means for applying inward pressure to said belt body, and means for heating said rubber member to cause said blowing agent to expand and apply outward pressure to said belt body.

14. An apparatus for making transmission belts from uncured belt bodies having endless tension cords embedded therein, comprising a substantially cylindrical mold made of a plurality of stacked rings forming inner and side walls of annular cavities between rings for receiving said bodies, uncured cylindrical rubber strips mounted on the inner walls of said cavities, the outer surfaces of said strips contacting the inner surfaces of said bodies, and means for applying heat and inward pressure against said bodies, said strips capable of expansion under heat to apply outward pressure against said bodies while said bodies are cured by said heat.

References Cited

UNITED STATES PATENTS

| 3,078,205 | 2/1963 | Sauer et al. | 18—6 |
| 3,164,026 | 1/1965 | Terhune | 156—79 |

JULIUS FROME, *Primary Examiner.*

L. GARRETT, *Assistant Examiner.*

UNITED STATES PATENT OFFICE
CERTIFICATE OF CORRECTION

Patent No. 3,398,218                                     August 20, 1968

Kenneth D. Richmond

It is certified that error appears in the above identified patent and that said Letters Patent are hereby corrected as shown below:

Column 4, TABLE I, second column, line 2 thereof, "17/3" should read -- 17/32 --; same column, line 4, "19/3" should read -- 19/32 --; same TABLE I, third column, line 5 thereof, "9/3" should read -- 9/32 --.

Signed and sealed this 3rd day of March 1970.

(SEAL)
Attest:

Edward M. Fletcher, Jr.                          WILLIAM E. SCHUYLER, JR.
Attesting Officer                                              Commissioner of Patents